(Model.)

D. C. SMITH.
MOSQUITO BAR AND CANOPY HOLDER.

No. 294,088. Patented Feb. 26, 1884.

Attest:
Carl Spengel
Millie Spengel

Inventor
Dewitt C. Smith

UNITED STATES PATENT OFFICE.

DEWITT C. SMITH, OF CINCINNATI, OHIO.

MOSQUITO BAR AND CANOPY HOLDER.

SPECIFICATION forming part of Letters Patent No. 294,088, dated February 26, 1884.

Application filed July 23, 1883. (Model.)

*To all whom it may concern:*

Be it known that I, DEWITT C. SMITH, of Cincinnati, Hamilton county, State of Ohio, have invented a new and useful Mosquito Bar and Canopy Holder, of which the following is a true and correct specification.

My invention relates to such devices as are used to suspend and maintain in shape a mosquito-bar above a bed. After use, it can be folded up, the bar is wound around the folded holder, and the whole, thus forming a compact package, is ready to be stored away. The device commonly used is a ring, but on account of its shape it cannot be stored away to any advantage, nor can the bar be rolled around easily. Other devices which serve about the same purpose as mine are more complicated, and consequently expensive. I refer to mosquito-bar holders in umbrella shape.

Figure 1:
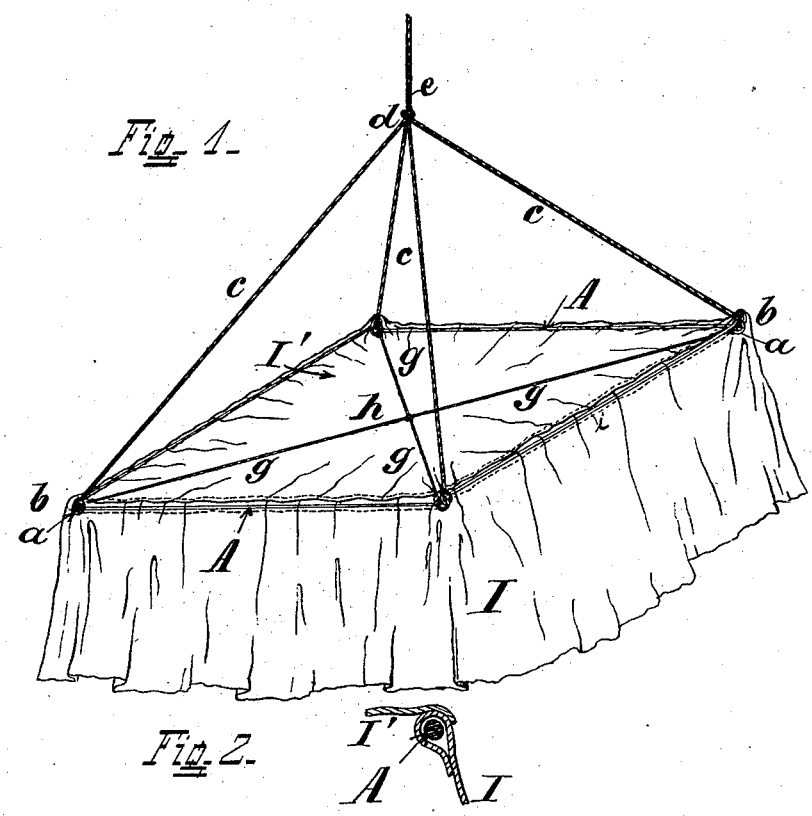
Figure 2:
Figure 3:
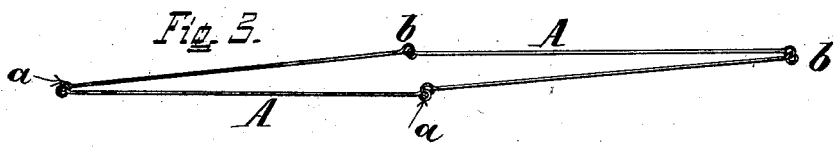
Figure 4:
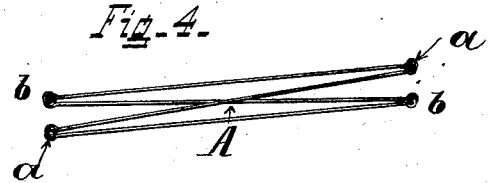
Figure 5:
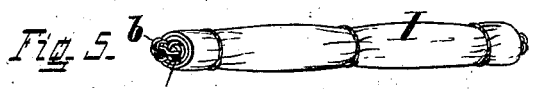

In the accompanying drawings, Figure 1 represents by perspective view my holder in use and part of a mosquito-bar. Fig. 2 is a cross-section at right angles to one of the rods of the holder, showing mode of attachment of bar to holder and top part of bar to the lower part of it, respectively. Figs. 3 and 4 show different stages of the holder while being folded. Fig. 5 shows the holder folded and the bar wrapped around it.

My improved and simplified holder consists of three or more rods, A, of light, thin, but sufficiently stiff material, such as steel wire. These rods are on both their ends provided with or, if wire, bent into small eyelets $a$, and by such means connected with each other, similar to the links of an endless chain. (See Fig. 1.) The holder is suspended as follows: To one eyelet $a$ of each joint $b$ is tied a cord, $c$. Said cords $c$, being all of equal and sufficient length to suspend the holder, join all in one knot, $d$, from whence a single cord, $e$, runs over a roller or hook fastened to the ceiling in the customary way. Other cords, $g$, of equal length, run from a knot, $h$, in the plan center of the holder diagonally out to each joint $b$, where they are fastened to one or the other eyelet. The upper edge, $i$, of bar proper, I, is lapped over the rods and fastened to them. The top part, I', of the bar is sewed to the overlapped edge $i$ of bar I, as shown in Fig. 2. As soon as suspended, the holder will assume the required shape, and will be held therein by the gravity of the suspended bar I, the suspending-cords $c$, and the cords $g$. When the bar is taken down after use, the flexibility of the holder permits it to be folded up to the length of one single rod, the bar is wrapped around the folded rods, and the whole, forming a compact package, is ready to be stored away. I refer to Figs. 3, 4, and 5.

The advantages of being enabled to reduce the size of the holder, which for a great part of the year is not in use, to the smallest possible space and into a shape far superior to the circular form commonly used are most prominent not only for private use, but more particularly for stores and warerooms of the interested manufacturers and dealers.

I claim as new and of my invention—

In combination with a mosquito-bar, the mosquito-bar holder herein described, consisting of a series of rods, A, provided with eyelets $a$, and connected as set forth, and the suspending-cords $c$ and cords $g$, as and for the purpose described.

In testimony of which invention I hereunto set my hand.

DEWITT C. SMITH.

Attest:
CARL SPENGEL,
D. W. C. LEE.